US008025230B2

(12) United States Patent
Moraites et al.

(10) Patent No.: US 8,025,230 B2
(45) Date of Patent: Sep. 27, 2011

(54) SYSTEM AND METHOD FOR PRIORITIZING VISUALLY AIMED THREATS FOR LASER-BASED COUNTERMEASURE ENGAGEMENT

(75) Inventors: Stephen C. Moraites, Owego, NY (US); Carl R. Herman, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 832 days.

(21) Appl. No.: 12/104,610

(22) Filed: Apr. 17, 2008

(65) Prior Publication Data

US 2009/0173788 A1 Jul. 9, 2009

Related U.S. Application Data

(60) Provisional application No. 61/018,972, filed on Jan. 4, 2008.

(51) Int. Cl.
*G06F 19/00* (2006.01)
(52) U.S. Cl. ..................................... 235/411; 235/404
(58) Field of Classification Search .................. 235/404, 235/407, 411, 412, 413, 414, 415, 416, 417
See application file for complete search history.

(56) References Cited

U.S. PATENT DOCUMENTS

| | | | |
|---|---|---|---|
| 4,647,759 A | 3/1987 | Worsham et al. | |
| 4,990,920 A | 2/1991 | Sanders, Jr. | |
| 5,287,110 A | 2/1994 | Tran | |
| 5,461,571 A | 10/1995 | Tran | |
| 5,549,477 A | 8/1996 | Tran et al. | |
| 5,808,226 A | 9/1998 | Allen et al. | |
| 5,992,288 A | 11/1999 | Barnes | |
| 6,741,341 B2 | 5/2004 | DeFlumere | |
| 6,822,583 B2 | 11/2004 | Yannone et al. | |
| 6,836,320 B2 | 12/2004 | Deflumere et al. | |
| 6,985,212 B2 | 1/2006 | Jamieson et al. | |
| 6,995,660 B2 | 2/2006 | Yannone et al. | |
| 7,026,600 B2 | 4/2006 | Jamieson et al. | |
| 7,035,308 B1 | 4/2006 | McNeil et al. | |
| 2004/0027257 A1 | 2/2004 | Yannone et al. | |
| 2006/0000988 A1 | 1/2006 | Stuart et al. | |
| 2006/0017939 A1 | 1/2006 | Jamieson et al. | |
| 2006/0163446 A1 | 7/2006 | Guyer et al. | |
| 2008/0206718 A1* | 8/2008 | Jaklitsch et al. | ................ 434/12 |

* cited by examiner

*Primary Examiner* — Karl D Frech
(74) *Attorney, Agent, or Firm* — Burr & Brown

(57) ABSTRACT

The present invention increases the survivability of a helicopter by prioritizing a threat engagement sequence for a laser-based countermeasure system based on the determined relative lethality of each detected visually trained threat (e.g., small arms fire). The system and method defines a plurality of threat effectiveness merit factors, or lethality factors, that are determinable from available helicopter navigation and sensor data, to quantify the danger associated with each detected threat. The system and method then combines the defined lethality factors using a mathematical function, such as a merit function, to numerically quantify the level of threat posed by each threat. The calculated threat values for each of the detected threats are compared to prioritize the threats for engagement by a laser-based countermeasure system, such as a Visual Acquisition Disrupter (VAD) system.

20 Claims, 4 Drawing Sheets

Threat Prioritization for VAD

R= Threat range
L= Threat weapon lethality
T= Flight vector aspect to shooter
H1= Past exposure to threat
H2= Past VAD CM applied to threat
V (θ) = Aspect dependant vulnerability of airframe
α = coefficients that emphasize and de-emphasize factors First Embodiment Including Dedicated Survivability Processor

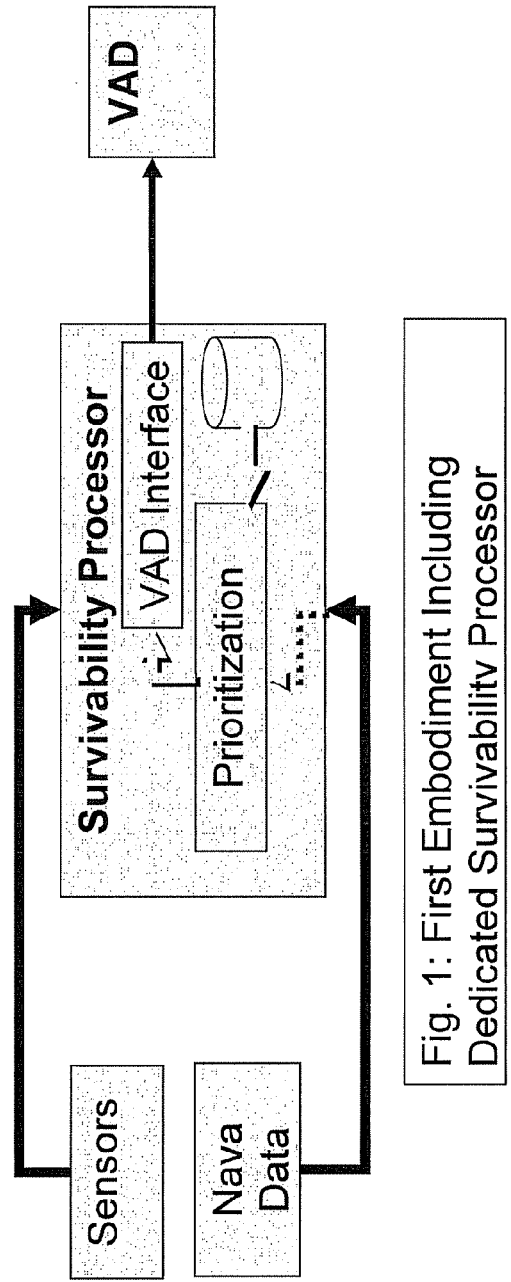
Threat Prioritization for VAD
R = Threat range
L = Threat weapon lethality
T = Flight vector aspect to shooter
H1 = Past exposure to threat
H2 = Past VAD CM applied to threat
V(θ) = Aspect dependant vulnerability of airframe
α = coefficients that emphasize and de-emphasize factors
Fig. 1: First Embodiment Including Dedicated Survivability Processor Fig. 2: Example of Angle θ of T Factor
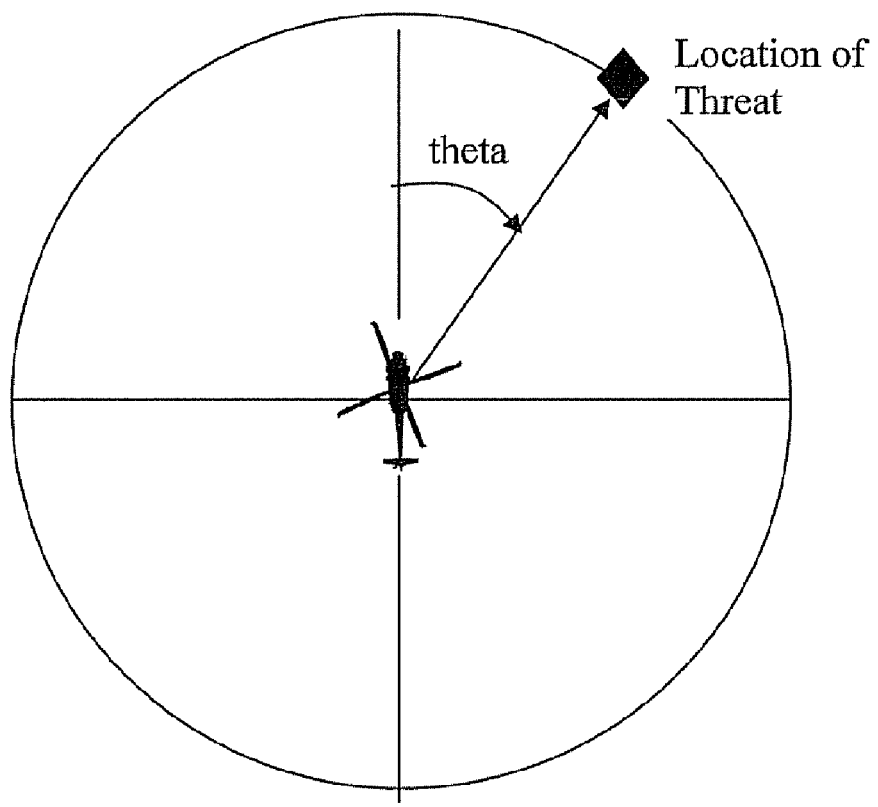

Figure 3: Example Values for Flight Vector Aspect (T) Factor
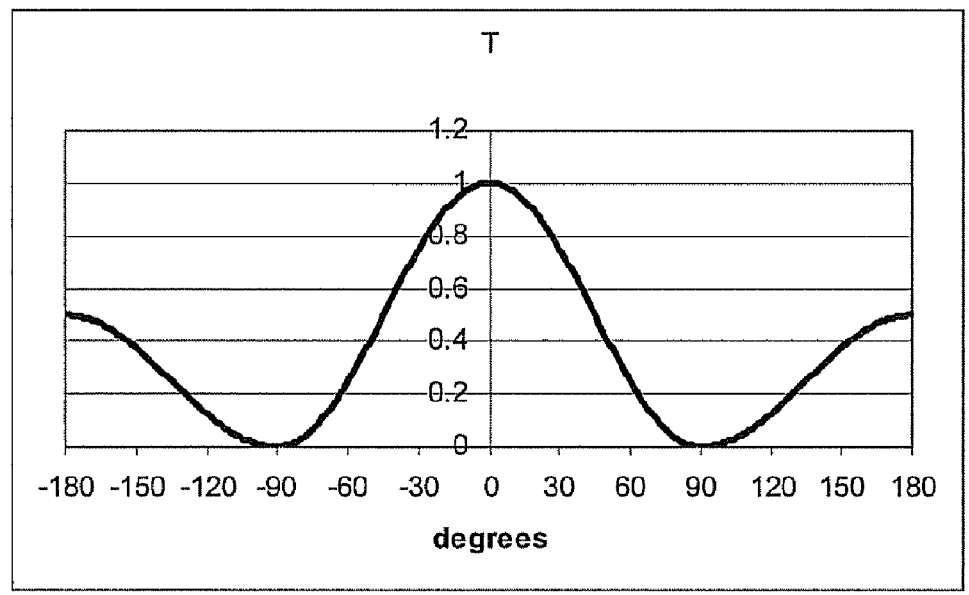
Figure 4: Example of Past VAD countermeasure (C) Factor Values
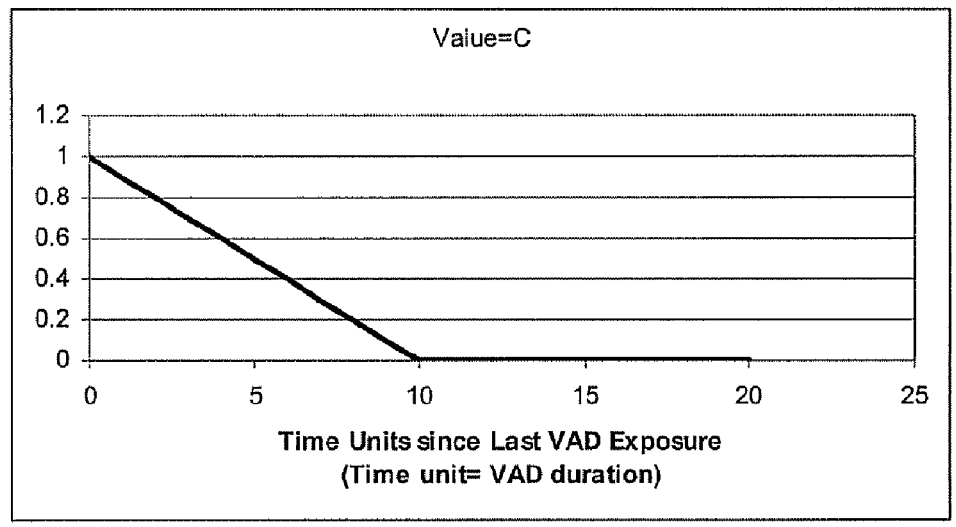

Figure 5: Example Angle θ Values For Aspect Dependent Vulnerability (V) Factor
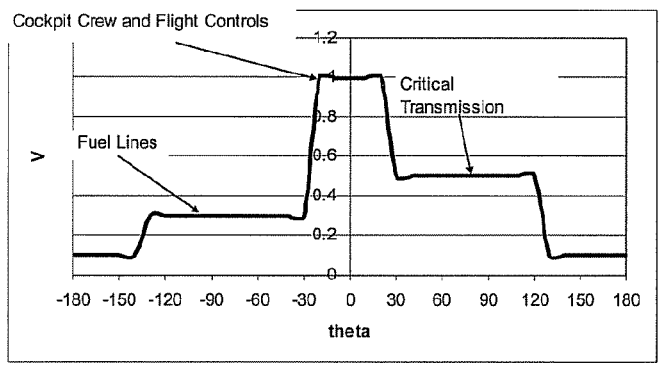
Figure 6: Threat Scenario For Threat Lethality Calculations Example
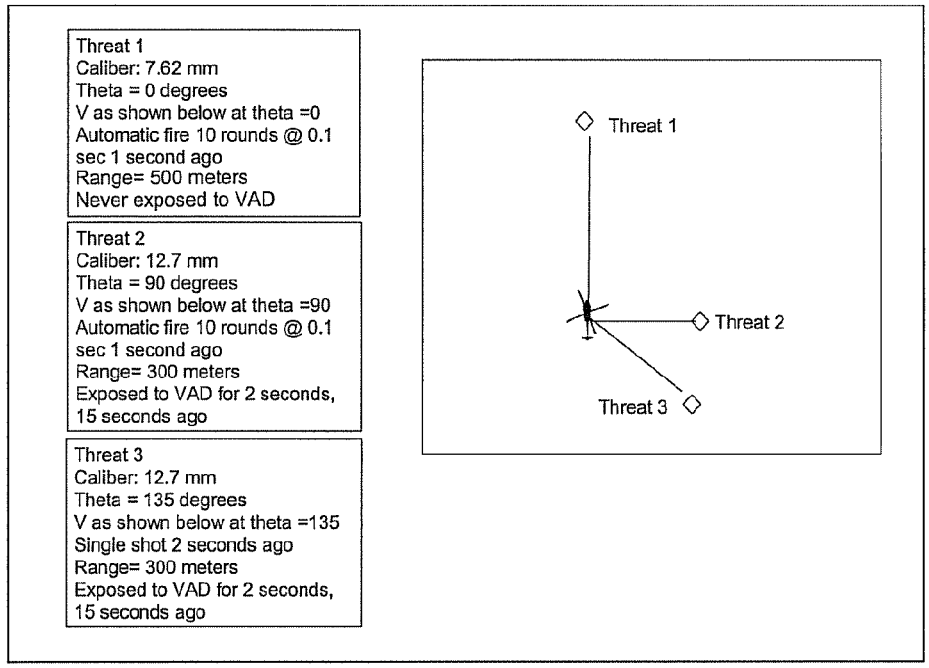

SYSTEM AND METHOD FOR PRIORITIZING VISUALLY AIMED THREATS FOR LASER-BASED COUNTERMEASURE ENGAGEMENT

FIELD OF INVENTION

The present invention relates to a system and method for prioritizing optically or visually aimed threats, such as small arms weapons, for engagement by a laser-based optical countermeasures system, such as a visual acquisition disrupter (VAD) system, on board a vehicle such as a helicopter. The method calculates threat effectiveness, or merit factors, for each detected threat from available navigation and sensor data, calculates the level of threat, or potential lethality, of each detected threat relative to the other detected threats, and prioritizes the detected threat engagement sequence based on the relative lethality of each detected threat.

BACKGROUND OF THE INVENTION

The operational environment for a helicopter may include several different types of threats including but not limited to other aircraft, missiles and small arms fire. To operate and survive in this hostile environment, many helicopters are equipped with suites of advanced electronic sensor systems. For example, many helicopters are equipped with electronic warfare (EW) equipment, such as electronic support measures (ESM) or Radar Warning Receiver (RWR) systems, which detect radio frequency (RF) signals emitted by other aircraft and ground-based systems, and determine the characteristics of the detected RF signal (e.g., frequency, pulse repetition frequency (PRF), pulse width (PW), etc.). These EW systems may also determine the RF emitter type, operating mode of the RF emitter and provide visual or aural alerts or warnings to the aircrew indicating whether the detected RF signal is associated with a potential threat to the helicopter. However, because no RF signals are emitted by visually trained man portable weapons, such as AK-47s, the bullets fired from these weapons are not detected by these advanced sensor systems.

Many helicopters are also equipped with one or more countermeasure systems. Installed countermeasure systems, such as chaff and flares, protect the helicopter from heat seeking or radar guided weapons, by creating additional targets within the field of view (FOV) of the approaching missile. Coordinating the discharge of chaff and flares with extreme helicopter maneuvers causes the guidance system of the approaching missile, such as an infrared (IR) seeker or radar receiver, to miss the helicopter by causing the missile to become confused and lose the helicopter (i.e., break radar or IR tracking) in discharged chaff and flares.

Another type of countermeasure system used to counter IR-guided missiles is laser-based countermeasure systems, such as directional infrared countermeasure (DIRCM) system. DIRCM uses ultra-compact, solid-state, diode pumped lasers to transmit multiple laser lines in the mid-IR spectrum to jam virtually all currently fielded IR missiles. The DIRCM countermeasures system will be installed on slower-moving aircraft to autonomously detect, track and jam infrared threat missiles targeting them. However, none of the aforementioned countermeasure systems are effective against small projectiles, such as bullets, from visually trained small arms weapons.

Since helicopters typically operate at low altitudes and frequently hover or fly at low speed, bullets fired from visually trained small arms weapons pose a serious threat to helicopters, and can cause significant damage to helicopters, resulting in system failures, loss of the helicopter and the killing or maiming of the crew.

Hostile Fire Indicating (HFI) systems have been added to the equipment installed on many helicopters. HFI systems detect the presence of weapons being fired in the vicinity of the aircraft. HFI systems detect the firing of bullets or small projectiles either with optical sensors that detect the muzzle flash associated with the firing of a weapon, or with acoustic pressure sensors, such as piezoelectric transducers that detect the disturbance in the atmosphere created by the shock wave generated by the bullet or small projectile moving through the air. However, HFI systems are strictly limited to detecting the presence of small arms firing activity in the vicinity of the helicopter, providing a bearing of the location of the detected small arms firing from the helicopter, and providing a warning to the crew. HFI systems cannot counter the danger posed by small arms fire.

A laser-based system for countering the threat posed by visually trained small arms weapons has been proposed in recent years. The laser-based system transmits one or more laser beams to disrupt or interfere with the visual targeting capability of individuals firing small arms weapons (i.e., shooters). The capabilities of such a laser-based visual acquisition disrupter (or VAD) system are discussed in greater detail later in the specification.

The current VAD system prioritizes targets for engagement primarily based on two criteria: (a) the distance of the shooter from the helicopter; and (b) the most recent shooter to fire at the helicopter. This engagement prioritization scheme basically assigns higher priority to targets that are (a) closer in range (distance) to the helicopter and (b) the most recent to shoot at the helicopter (i.e., "last in—first out" (LIFO) time of last shot). However, the most recent shooter (i.e., LIFO time) or the shooter that is closest to the helicopter (i.e., shortest range) may not necessarily pose the greatest threat to the helicopter because small arms weapons vary in potential effectiveness against a helicopter based on many factors, including the size (i.e., caliber) of the fired projectile and muzzle velocity, rate of fire, and effective range of the weapon, for example. In addition, depending on the orientation of the helicopter with respect to the location of the shooter, the shooter closest to the helicopter in range may have the lowest probability of hitting the helicopter because of the high rate of angular change and small visible area of the helicopter with respect to the location of the shooter.

Therefore, since the current LIFO time and distance target engagement prioritization of the VAD system fails to assess the potential effectiveness, or lethality, of the threat posed by different weapons, it fails to adequately counter the visually trained small arms fire threat to the helicopter. More specifically, in a multiple threat environment, the LIFO time and distance target engagement prioritization of the current VAD system will fail to effectively counter the most effective (i.e., lethal) threats to the helicopter.

Therefore, what is needed is a system and method for controlling a VAD system to more effectively counter visually trained small arms threats to helicopters.

SUMMARY OF THE INVENTION

The system and method of the present invention performs a lethality assessment of the relative lethality of each detected optically or visually trained small arms threat from data inputs from available navigation and sensor systems, and prioritizes the threats based on their assessed relative lethality of the threat to the helicopter for engagement by the VAD system. From the available data inputs, the present invention determines a plurality of threat effectiveness, or lethality, merit factors. The determined lethality factors are input into a mathematical function (such as merit function) to calculate a lethality value for each threat to the helicopter. The present invention then compares the calculated lethality value for a detected threat to the lethality values for the other detected threats and prioritizes the engagement sequence of the VAD system based on the assessed relative lethality of the detected threats.

The lethality factors used by the present invention include multiple data inputs to quantify the danger associated with each detected threat. The present invention uses a mathematical function, such as merit function, to calculate a discrete mathematical lethality value for each detected threat from the lethality factors. By using calculated lethality values and the assessed relative lethality of detected threats for prioritizing and controlling the engagement sequence of the VAD system, the present invention increases the effectiveness of the VAD countermeasure system in protecting the helicopter and enhances the survivability of the helicopter and aircrew.

BRIEF DESCRIPTION OF THE DRAWINGS

FIG. 1 depicts a first embodiment of the present invention having a dedicated survivability processor including VAD engagement control functionality;

FIG. 2 depicts an example of angle θ of the flight vector aspect (T) factor of the present invention;

FIG. 3 provides another example of values for the flight vector aspect (T) factor of the present invention;

FIG. 4 provides an example of values for the past VAD countermeasure (C) factor of the present invention;

FIG. 5 provides an example of angle θ values for the aspect dependent vulnerability (V) factor of the present invention; and FIG. 6 depicts a threat scenario for threat lethality calculations example.

DETAILED DESCRIPTION OF THE INVENTION

The system and method of the present invention use available navigation and sensor data to determine the disclosed threat effectiveness or lethality factors associated with each optically or visually trained small arms threat, inputs the determined lethality factors into a mathematical function to calculate a lethality value for each detected threat, compares the calculated lethality values to assess the relative lethality of each detected threat, and then prioritizes the detected threats for engagement by the VAD system based on their assessed relative lethality.

More specifically, the present invention determines threat effectiveness or merit factors for each detected threat using navigation and sensor data, inputs the determined threat effectiveness factors into a merit function to quantify the potential lethality of each threat relative to the other detected threats, and prioritizes the detected threat engagement sequence based on the relative lethality of each detected threat. By prioritizing and controlling the engagement sequence of the VAD system based on the assessed relative lethality of each detected threat, the system and method of the present invention enhances the survivability of the helicopter and aircrew.

In a first embodiment of the present invention, shown in FIG. 1, the disclosed system includes an HFI system, a VAD system and a dedicated VAD engagement control processor, including VAD engagement control software running on the processor. The VAD engagement control processor provides the processing, prioritization and command and control functions of the present invention necessary for effectively using the VAD system to counter detected threats.

In a second embodiment of the present invention, the disclosed system includes an HFI system and a VAD system with the VAD engagement control software of the present invention embedded and operating on a VAD system processor. The VAD engagement control functionality may also be incorporated on another existing helicopter processor, such as a flight systems or mission system processor, that includes and is executing other functionality, such as an operational flight systems or mission systems program, in parallel with the present invention. In these embodiments, the present invention uses equipment already installed on the aircraft to provide prioritization and control of the VAD system, and as such does not require any additional hardware that would increase the weight of the helicopter. Thus, the present invention enhances aircraft and aircrew survivability without any adverse affect on the range and endurance capabilities of the helicopter airframe.

The primary functions of the existing aircraft systems included in the first and second embodiments of the present invention, an HFI system and a VAD system, and how the existing systems are modified and/or controlled by the present invention are discussed below.

Hostile Fire Indicator System (HFI)

The primary function of the existing hostile fire indicator (HFI) system is to detect the firing of weapons in the vicinity of the aircraft. The HFI system uses optical sensors, such as infrared cameras, to detect the muzzle flash associated with the firing of a weapon.

When the HFI system detects the firing of a small arms weapon, the HFI system outputs a warning to a pilot that small arms fire has been detected in the vicinity of the aircraft and provides the bearing (direction) relative to the helicopter from which the detected small arms fire originated. The bearing accuracy of HFI systems using optical detection sensors, such as infrared cameras, to detect the muzzle flash of a weapon is at least +/−10 degrees of the true bearing of the muzzle flash, and some HFI systems can provide bearing information that is within +/−1 degree or less of the true bearing. The HFI detects the muzzle flash of the weapon, initially estimates the location of the muzzle flash and notifies the prioritization algorithm of the VAD engagement control functionality to add a new entry into the list of potential hostile shooters.

The HFI system estimates the location or position of the shooter by superimposing (e.g., plotting) the detected bearing line or angle of arrival (AOA) of the muzzle flash on a topographical map of the terrain of the area and estimating an initial location for the shooter from muzzle flash intensity and terrain features, for example. The HFI system updates the estimated shooter location as additional information, such as subsequent shots, becomes available.

In addition, the HFI system uses a very fast frame rate for the detection of muzzle flashes associated with small arms firings. The very fast frame rate of the HFI system enables the HFI system to differentiate muzzle flashes of different weapons and, depending on distance from the helicopter, characterize the type of weapon that was fired. Based on the muzzle flash characterization, the HFI determines the type of weapon detected firing. For example, the brightness or intensity of the muzzle flash relatively close to the helicopter, may enable the HFI to determine that the weapon fired was an AK-47. Where the HFI can characterize the weapon type associated with the detected muzzle flash, the weapon type and specific characteristics of the weapon, such as muzzle velocity and bullet caliber, are transmitted to the VAD engagement control functionality.

In the first embodiment of the present invention, shown in FIG. 1, and the disclosed second embodiment, the HFI system is used to detect the small arms weapon firing (its existing primary function) and provide bearing information and weapon characterization information, if available, for the detected small arms weapon firing to the VAD engagement control functionality. The VAD engagement control processor or functionality can receive the HFI system output data either from a system bus interface or a dedicated interface.

Visual Acuity Disrupter (VAD) System

The VAD system for countering the threat posed by visually trained small arms weapons, transmits one or more laser beams to disrupt or interfere with the visual targeting capability of the shooters firing the small arms weapons. More specifically, the VAD system radiates a laser beam with sufficient power to temporarily impair the visual acuity of a shooter, causing the shooter to see spots or lingering after images for a predetermined period of time after being illuminated by the laser. The laser beam of the VAD system is moved in predetermined patterns, such as a raster scan pattern, to account for errors resulting from the flight environment of the VAD system (e.g., platform vibration and flight maneuvers) and errors associated with the location of the shooter. The predetermined radiation pattern temporarily impairs the eyesight of individuals within an area in the vicinity of the location of the shooter, including the shooter.

The VAD system can effectively counter or engage multiple shooters at different positions in a short period of time because the temporary impairment of the shooter's visual acuity lingers. The impairment of visual acuity caused by the VAD system is temporary; the length of the visual impairment time period depends on the power level or intensity of the laser beam signal that is received by the eyes of the individual. The VAD system includes a laser range finder to determine the distance to the threat and modify the power level of the radiated signal (i.e., laser beam) to ensure the impairment of visual acuity of the shooter is only temporary.

The VAD system will engage detected shooters within about 500 meters of the helicopter. The VAD system typically does not prioritize or engage shooters that are located more than 500 meters from the helicopter based on the ineffectiveness of small arms weapons at distances greater than 500 meters and the power required for the VAD to effectively disrupt the shooters visual acuity.

In the first embodiment of the present invention, shown in FIG. 1, The VAD system is modified to accept command and control functions from the survivability processor, including VAD engagement control functionality, and engage detected threats, as directed. In the second disclosed embodiment, The VAD system is modified to embed the VAD engagement control functionality and accept command and control functions from the embedded VAD engagement control functionality.

VAD Engagement Control Functionality

To provide more effective application of the VAD system to counter the visually trained small arms threat, the present invention uses a mathematically based prioritization of detected threats based on an assessment of the level of threat posed by each detected visually trained weapon. To assess the level of threat posed by a detected threat, a number of factors that most effectively quantify the lethality of each threat (i.e., lethality factors) are initially defined, and then combined in a mathematical expression to numerically quantify the lethality of each threat for comparison. The mathematical expression used in the disclosed embodiments is a merit function, which is discussed later herein. In situations where one or more of the defined lethality factors may not be available, the present invention uses default values for the unavailable lethality factors with the available lethality factors to assess the lethality of the detected threats and prioritize the VAD system engagement sequence accordingly.

Threat Assessment/Lethality Factors

The basic requirements for the lethality factors are that each must be either available or determinable based on data from existing helicopter navigation and sensor systems, and must provide a valid representation of the potential lethality of a threat to the helicopter. The six lethality factors used in the present invention, which are available or determinable from existing navigation or sensor data, are (in no particular order):

(i) lethality of threat weapon (L) factor;

(ii) flight vector aspect to shooter (T) factor;

(iii) threat range to helicopter (R) factor;

(iv) past exposure to threat (H) factor;

(v) past application of VAD to shooter (C) factor; and (vi) aspect dependent vulnerability of helicopter airframe (V) factor.

The rationale for the importance of each lethality factor in assessing the lethality of threats and at least one source for the data necessary for the lethality factor are discussed below.

(i) Lethality of Threat Weapon (L) Factor

The lethality of a threat weapon represents a single projectile's relative ability to damage the structure that it hits. The lethality of threat weapon (L) factor assesses the ability of the threat weapon to inflict serious damage to the helicopter and aircrew. The lethality of a threat weapon is assessed based on several weapon specific factors, including the muzzle velocity, rate of fire, and effective range of the weapon, as well as the caliber of the bullet fired. In one embodiment, the L Factor is quantified by quantitative means, including estimating the kinetic energy of the projectile based on its standard muzzle velocity and its mass, where the caliber of the weapon is estimated.

In another embodiment, the L Factor is determined by the HFI system using muzzle flash data associated with the detected weapon firing. As previously discussed, the HFI characterizes weapon type fired based on the characteristics of the muzzle flash, such as intensity and duration, for example. Based on these muzzle flash characteristics, the HFI determines the type of weapon fired by performing a time domain analysis of the muzzle flash to match its time domain signature with pre-recorded signatures of muzzle flashes from weapons of known calibers. Another approach for providing a quantitative value for L Factor is to assign a value based on the brightness of the flash, normalized by the estimated range of the projectile such that:

$$L = IR^2 \qquad \text{(Equation 1)}$$

where I is the intensity upon the sensor that detects the muzzle flash, and R is the range to the location of the detected muzzle flash (location of shooter).

In another embodiment of the present invention, the L Factor is a simple assignment of numerical value based on the caliber of the weapon, such as shown in Table 1:

TABLE 1

Example Values for L Factor

| Estimated Caliber | Value of L |
|---|---|
| <5.56 mm | 1 |
| 5.56 mm | 2 |
| 7.62 mm | 3 |
| 12.7 mm | 4 |
| >12.7 mm | 5 |

The VAD engagement control functionality uses the estimated caliber of weapon-fired from the HFI system to determine a lethality factor value for the weapon. The assessed lethality factor increases for a threat based on larger caliber bullets and weapons having higher muzzle velocity, effective range and rate of fire characteristics.

(ii) Flight Vector Aspect To Shooter (T) Factor

The flight vector aspect to shooter (T) factor assesses the angle of the helicopter with respect to the location of the shooter. The flight vector aspect takes into account two assumed effects: 1) helicopters moving rapidly across the shooters field of view are more difficult to hit than helicopters that are not moving rapidly across the shooter's field of view; and 2) threats that the helicopter is approaching are a greater threat than threats that the helicopter has passed and is moving away from. In one embodiment, a quantitative value is assigned to the T factor using the following trigonometric function:

$$T = P(\theta) * \cos^2(\theta) \quad \text{(Equation 2)}$$

In this embodiment, the assigned value of $P(\theta)=1$ where $-90<\theta<90$ and $P(\theta)=0.5$ for all other angular values. $\theta$ is the bearing angle of the threat location from the flight vector of the helicopter (e.g., from the nose of the helicopter under most flight conditions), as shown in FIG. 2. The value of $\theta$ varies between 0 and 1, as shown in FIG. 3.

In one embodiment of the present invention, the HFI system provides the $\theta$ angle from helicopter navigation data and HFI determined bearing (or angle of arrival (AOA)) of the muzzle flash and the HFI estimated location of the shooter that is determined by projecting (i.e., superimposing) a line coincident with the angle of arrival of the muzzle flash signal on a digital topographic model of the ground, and estimating the location of the shooter by computing the intersection of the line with topographical features of the modeled ground, for example.

The location of the threat can also be determined using standard triangulation techniques where there is more than one weapon firing (muzzle flash) detected from the same weapon and the helicopter is moving such that each muzzle flash detection occurs when the helicopter is at a different position, providing a baseline for triangulation. The location of the threat can also be determined through triangulation when there is more than one sensor detecting the muzzle flash, such as situations where two helicopters are operating together.

(iii) Threat Range to Helicopter (R) Factor

The threat range to the helicopter (R) factor assesses the potential threat posed by the weapon based on distance from the helicopter. The R Factor accounts for the decrease in effectiveness of the weapon as the range between the weapon and helicopter increases.

The VAD engagement control functionality can determine the range of the shooter from the helicopter from several sources including helicopter navigation data for orientation or angle of the helicopter and the HFI determined location of the shooter, which includes bearing and estimated range, for example. The R Factor can also be determined using range data from the range finder laser of the VAD system.

The assessed R Factor increases for threats closer to the helicopter and decreases as the range from the helicopter increases. Threats that are more than 500 meters, for instance, from the helicopter are not engaged by the VAD system and are discarded from the lethality assessment.

(iv) Past Exposure to Threat (H) Factor

The past exposure to threat (H) factor assesses the helicopter's potential vulnerability to serious damage from the shooter. The H Factor is based on a measure of the number of shots received (past) and the expected number of shots to be received (future) from a particular threat.

In one embodiment of the present invention, the H Factor is determined by the following equation $$H = \sum_{i=\text{most recent shot}}^{n=\text{oldest recorded shot}} \frac{1}{T_i} \quad \text{(Equation 3)}$$

where H is the sum of the number of shots, each divided by the time since that shot. The determination of an H Factor requires a history of shots fired that are determined to originate from a particular location.

In one embodiment, the VAD engagement control functionality assigns detected weapon firings to a particular location using known standard correlation techniques coupled with a geo-location capability for estimating the range and aspect angle to the threat, such as using the helicopter navigation data and the HFI determined location of the shooter, which, again, includes bearing and estimated range.

The assessed value of the H Factor decreases as the time between weapon firings from the location increases from the previous shots, and conversely the value of the H Factor increases as the time between weapon firings (i.e., rate of fire) increases.

(v) Past Application of VAD to Shooter (C) Factor

The past application of VAD to shooter (C) factor uses the elapsed time since the most recent application of VAD to the shooter's location to assess the state of the shooter's eyesight for acquiring the helicopter. In other words, the C Factor accounts for the presumed decrease in the threat effectiveness due to the lingering effects of VAD exposure. Again, the VAD effect is to saturate, without damaging, the retina of the eye. Saturation produces lingering after-images that reduce the ability of the threat to accurately shoot a weapon. But the effect wears off after a time that is dependent on the power of the VAD, the ambient light, the duration of VAD exposure, and the time occurring since the last VAD exposure.

The effects of VAD exposure are temporary and continue to impair the shooter's eyesight for a time period that is dependent on the duration of the last VAD exposure, as shown in FIG. 4. The time dependent decrease in effectiveness is also dependent on the VAD intensity, but is considered to be adjustable and constant for all threats.

The VAD engagement control functionality determines the range of the shooter from the helicopter from helicopter navigation data, and the HFI determined location of the shooter. The range to the shooter may also be provided by the laser range finder of the VAD system.

In one embodiment of the present invention, the C Factor is defined by a function that decreases since the last exposure until the effect is presumed to be nullified with time, as shown in FIG. 4. The specific shape of the curve will vary from the sample shown but will have the same qualitative effect of decreasing over time.

(vi) Aspect Dependent Vulnerability of Helicopter Airframe (V) Factor

The aspect dependent vulnerability of helicopter airframe (V) factor assesses the vulnerability of the major helicopter systems to serious damage based on the helicopter angle with respect to the location of the shooter and the helicopter system configuration. In other words, the V Factor accounts for the fact that certain views of the aircraft expose more vulnerable components than other views. This factor will vary not only by aircraft type (e.g., H3 and H-60) but also by aircraft configuration (e.g., MH-60 and SH-60).

The V Factor is calculated and quantified as the vulnerable square area, which is a function of the aspect angle, θ, to the threat using standard aircraft vulnerability analysis methods. In one embodiment of the present invention, the VAD engagement control functionality determines the helicopter aspect from helicopter navigation data and HFI determined location of the shooter (bearing and estimated range) and determines the associated helicopter vulnerability based on the helicopter configuration.

The value of the V Factor increases if the area of the helicopter visible to the shooter increases or the shooter's visible aspect includes critical flight systems. In one embodiment, the helicopter vulnerability value associated with a particular aspect is contained in a look-up table. An example of assessed V Factor values, with annotations describing the vulnerable flight system components responsible for increases in V Factor, are shown in FIG. 5.

Mathematical Function

The most effective way to combine the lethality factors to accurately assess the potential lethality of each threat needed to be determined is by using a mathematical function, such as a merit function. The present inventors discovered that, by combining the defined lethality factors using a mathematical model, such as merit function that is optimized for helicopter survivability, an efficient and statistically valid assessment of the potential danger (lethality) associated with each threat could be provided. For multi-threat environments, a priority merit value, or lethality value, is calculated for each threat using a priority or lethality merit function. The general form of a typical priority merit function is expressed here for the $i^{th}$ threat:

$$M_i = (\alpha_R, \alpha_L L, \alpha_T T, \alpha_H H, \alpha_c C, \alpha_V V) \quad \text{(Equation 4)}$$

where:
$M_i$=threat value of target
R=threat range;
L=lethality of threat weapon;
T=flight vector aspect to shooter
H=past exposure to threat;
C=Past VAD application to threat;
V(θ)=aspect dependent vulnerability of airframe; and
$\alpha_N$=coefficient emphasizing or de-emphasizing factor N, where N is any of the factors R through V above.

As should be noted, the present invention includes a α factor for each lethality factor in the merit function. The value of the α factor either emphasizes or de-emphasizes the effect of the associated factor in the overall merit function. In other words, the α factors are weighting coefficients. The weighting coefficients, α, provide the relative importance of each factor and the sign of the α coefficient determines whether that factor increases or decreases the lethality function value. The use of weighting coefficients in the merit function of the present invention enables the user to adjust the relative effect of the lethality factors in the merit function. This coefficient weighting increases the flexibility of the present invention to adapt for effectively responding in unexpected future operational scenarios, for example.

In one embodiment of the present invention, the merit function used for the $i^{th}$ threat is as follows:

$$M = (\alpha_L L_i + \alpha_T T_i + \alpha_V V_i + \alpha_H H_i + \alpha_R R_i + \alpha_c C_i) \quad \text{(Equation 5)}$$

where:
$M_i$=threat value of target
L=lethality of threat weapon;
T=flight vector aspect to shooter;
V(θ)=aspect dependent vulnerability of airframe;
H=past exposure to threat;
R=threat range;
C=Past VAD application to threat, and
$\alpha_N$=coefficient emphasizing or de-emphasizing factor N, where N is any of factors L, T, V, H, R or C.

An example of the merit function and the associated calculations using exemplary data for determining the relative lethality of multiple threats to the helicopter is provided below.

Example of Merit Function Calculations

The scenario depicted in FIG. 6 is used for this sample threat lethality calculation. The values of the weight coefficients, α, are determined using threat simulations or models, to determine the relative importance of each factor. The example α values are only provided as an example.

TABLE 2

Example of Lethality Calculations

| Factor | α factor | Threat 1 | Threat 2 | Threat 3 | Comment |
|---|---|---|---|---|---|
| L | 1 | 3 | 4 | 4 | From Table 1 |
| T | 1 | 1 | 0 | 0.2 | From FIG. 3 |
| V | 1 | 1 | .5 | .1 | From FIG. 5 |
| H | 1 | 7.2 | 7.2 | .5 | Equation 4 |
| R | −0.001 | 500 | 300 | 300 | From Example 1 data |
| C | −1 | 0 | .25 | .25 | From FIG. 4 |
| Calculated Lethality Value | | 11.7 | 11.15 | 4.75 | Includes effect of weighting coefficients, α |

In this example, threat 1 has the highest lethality value, with a relative lethality value of 11.7, and is identified as the highest priority threat for engagement by the VAD system.

In another embodiment of the present invention, an alternate functional form for the priority merit function is used, as shown below:

$$M_i = [(1+\alpha_L L_i)^*(1+\alpha_T T_i)^*(1+\alpha_V V_i)^* \\ (1+\alpha_H H_i)] / [(1+\alpha_R R_i)^*(1+\alpha_c C_i)] \quad \text{(Equation 6)}$$

where:
$M_i$=threat value of target
L=lethality of threat weapon;
T=flight vector aspect to shooter;
V(θ)=aspect dependent vulnerability of airframe;
H=past exposure to threat;
R=threat range;
C=Past VAD application to threat, and
$\alpha_N$=coefficient emphasizing or de-emphasizing factor N, where N is any of factors L, T, V, H, R or C, and the a weight coefficients are all positive and whether the factor is in the numerator or denominator determines whether the factor raises or lowers the value of the merit function.

While a specific merit function is disclosed for this example, the present invention can also use a merit function derived from a model, such as a survivability model, to assess the potential lethality of threats.

We claim:

1. A system for prioritizing detected targets for countermeasure system engagement from a helicopter, said system comprising:
   means for determining at least two threat lethality factors for more than one threat to the helicopter from existing helicopter navigation and sensor data;
   means for determining a lethality value for each of said more than one threat to the helicopter by combining said at least two lethality factors in a mathematical function;
   means for comparing said lethality value for each of said more than one threat to the helicopter;
   means for determining a target engagement priority sequence for a helicopter installed countermeasure system from comparing said lethality value for each of said more than one threat to the helicopter;
   means for transmitting said target engagement priority sequence to said helicopter installed countermeasure system; and
   means for commanding said helicopter installed countermeasure system to engage said more than one threat to the helicopter using said target engagement priority sequence.

2. The system of claim 1, wherein said means for determining at least two threat lethality factors uses data available from existing helicopter navigation and sensor systems to determine a location for each of said more than one threat to the helicopter.

3. The system of claim 2, wherein said more than one threat is a small arms weapon, and wherein said sensor systems provide at least bearing data for each discharged small arms weapon.

4. The system of claim 3, wherein said means for determining at least two threat lethality factors uses helicopter position and orientation angle from said helicopter navigation data and bearing data for each discharged small arms weapon from said sensor systems to determine a location for each discharged small arms weapon.

5. The system of claim 4, wherein said bearing data for each discharged small arms weapon is provided by a hostile fire indicator system.

6. The system of claim 5, wherein said hostile fire indicator system uses one or more characteristics of a muzzle flash from each small arms weapon discharge to estimate a caliber of said small arms weapon.

7. The system of claim 2, wherein said means for determining at least two threat lethality factors superimposes helicopter position from said helicopter navigation data and bearing data for each threat from said sensor systems on a digital topographic model of an area including said helicopter position and said bearing data for each threat to determine a location for each threat.

8. The system of claim 7, wherein said installed countermeasure system includes a laser range finder to determine a range to said location of each threat.

9. The system of claim 2, wherein said installed countermeasure system includes a laser range finder to determine a range to said location of each threat.

10. The system of claim 1, wherein said threat lethality factors comprise at least one of lethality of threat weapon factor, flight vector aspect to threat factor, threat range to helicopter factor, past exposure to threat factor, past application of countermeasure factor and aspect dependent vulnerability of helicopter airframe factor.

11. The system of claim 1, wherein said installed countermeasure system is a visual acquisition disrupter system.

12. The system of claim 1, wherein said means for determining said threat lethality value, said means for comparing said lethality values, and said means for determining a target engagement priority sequence are one or more software programs running on at least one processor resident on the helicopter.

13. The system of claim 1, wherein said means for determining threat lethality value weighs each of said lethality factors based on a relative importance using weighting coefficients, and combines said lethality factors and said weighting coefficients using a merit function to determine said threat lethality value.

14. The system of claim 13, wherein said means for determining threat lethality value combines said lethality factors and said weighting coefficients using a merit function of the following general form:

$$M_i = (\alpha_L L_i + \alpha_T T_i + \alpha_V V_i + \alpha_H H_i + \alpha_R R_i + \alpha_c C_i),$$

where $M_i$ is the threat value of target factor, R is the threat range factor, L is the assessed lethality of threat weapon factor, T is the flight vector aspect to shooter factor, H is the past exposure to threat factor, C is the past application of countermeasure to threat factor, $V(\theta)$ is the aspect dependent vulnerability of airframe factor, and $\alpha$ is the weighting coefficient associated with each factor.

15. The system of claim 13, wherein said means for determining threat lethality value combines said lethality factors and said weighting coefficients using a merit function of the following general form:

$$M_i = [(1+\alpha_L L_i)^*(1+\alpha_T T_i)^*(1+\alpha_V V_i)^* (1+\alpha_H H_i)]/[(1+\alpha_R R_i)^*(1+\alpha_c C_i)],$$

where $M_i$ represents the threat value of target factor, R is the threat range factor, L is the assessed lethality of threat weapon factor, T is the flight vector aspect to shooter factor, H is the past exposure to threat factor, C is the past application of countermeasure to threat factor, $V(\theta)$ is the aspect dependent vulnerability of airframe factor, and $\alpha$ is the weighting coefficient associated with each factor.

16. A method for prioritizing detected targets for countermeasure system engagement from a helicopter, said method comprising the steps of:
   determining from existing helicopter navigation and sensor data at least two threat lethality factors for each of said more than one threat to the helicopter;
   determining lethality values for each of said more than one threat to the helicopter by combining said at least two lethality factors in a mathematical function;
   comparing said lethality values determined for each of said more than one threat to the helicopter;
   determining a target engagement priority sequence for a helicopter-installed countermeasure system from comparing said lethality values;
   transmitting said target engagement priority sequence to said helicopter-installed countermeasure system; and
   commanding said helicopter-installed countermeasure system to engage said more than one threat to the helicopter using said target engagement priority sequence.

17. The method of claim 16 wherein said step of determining threat lethality value, said step for comparing said lethality values and said step for determining a target engagement priority sequence are performed by one or more software programs running on at least one processor resident on the helicopter.

18. The method of claim 16 wherein said step for determining lethality value further comprises the steps of:
   weighting said each of lethality factors based on a relative importance using weighting coefficients, and
   combining said at least two lethality factors and said weighting coefficients using a merit function.

19. The method of claim 18 wherein said step for determining said threat lethality value further comprises the steps of:
   weighting each lethality factor based on relative importance using weighting coefficients, and
   combining said lethality factors and said weighting coefficients using a merit function of the following general form:

$$M_i = (\alpha_L L_i + \alpha_T T_i + \alpha_V V_i + \alpha_H H_i + \alpha_R R_i + \alpha_c C_i),$$

where $M_i$ is the threat value of target factor, R is the threat range factor, L is the assessed lethality of threat weapon factor, T is the flight vector aspect to shooter factor, H is the past exposure to threat factor, C is the past application of countermeasure to threat factor, $V(\theta)$ is the aspect dependent vulnerability of airframe factor and $\alpha$ is the weighting coefficient associated with each factor.

20. The method of claim 18, wherein said step for determining said threat lethality value further comprises the steps of:
   weighting each lethality factor based on relative importance using weighting coefficients, and
   combining said lethality factors using a merit function of the following general form:

$$M_i = [(1+\alpha_L L_i)*(1+\alpha_T T_i)*(1+\alpha_V V_i)*(1+\alpha_H H_i)]/[(1+\alpha_R R_i)*(1+\alpha_c C_i)],$$

where $M_i$ is the threat value of target factor, R is the threat range factor, L is the assessed lethality of threat weapon factor, T is the flight vector aspect to shooter factor, H is the past exposure to threat factor, C is the past application of countermeasure to threat factor, $V(\theta)$ is the aspect dependent vulnerability of airframe factor, and $\alpha$ is the weighting coefficient associated with each factor.

* * * * *